Figure 9:
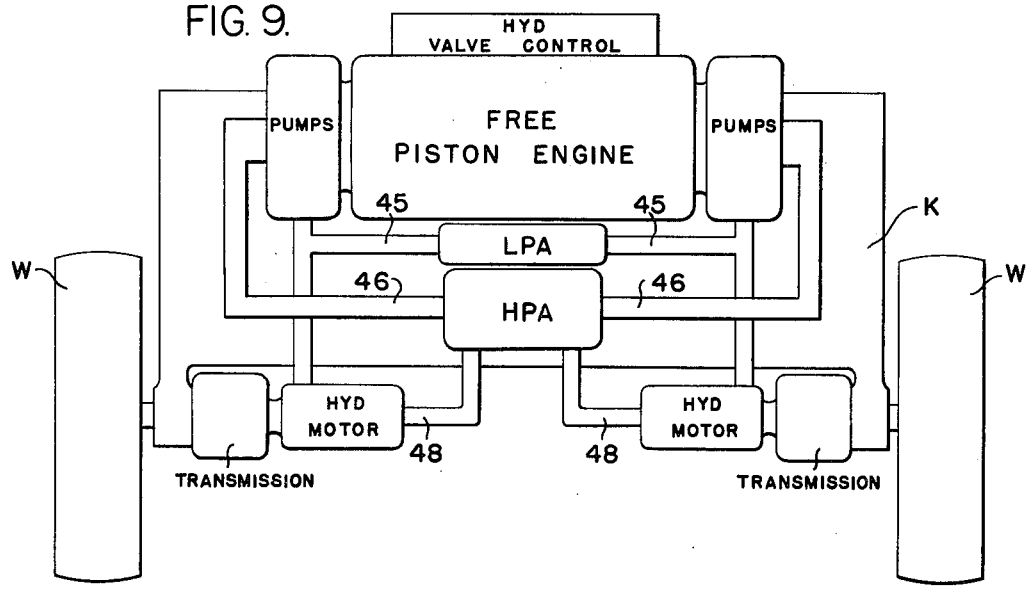

Aug. 10, 1965  E. A. WACHSMUTH  3,199,456
VEHICLE AND CONTROL SYSTEM THEREFOR
Filed July 12, 1960  6 Sheets-Sheet 1
FIG. I.
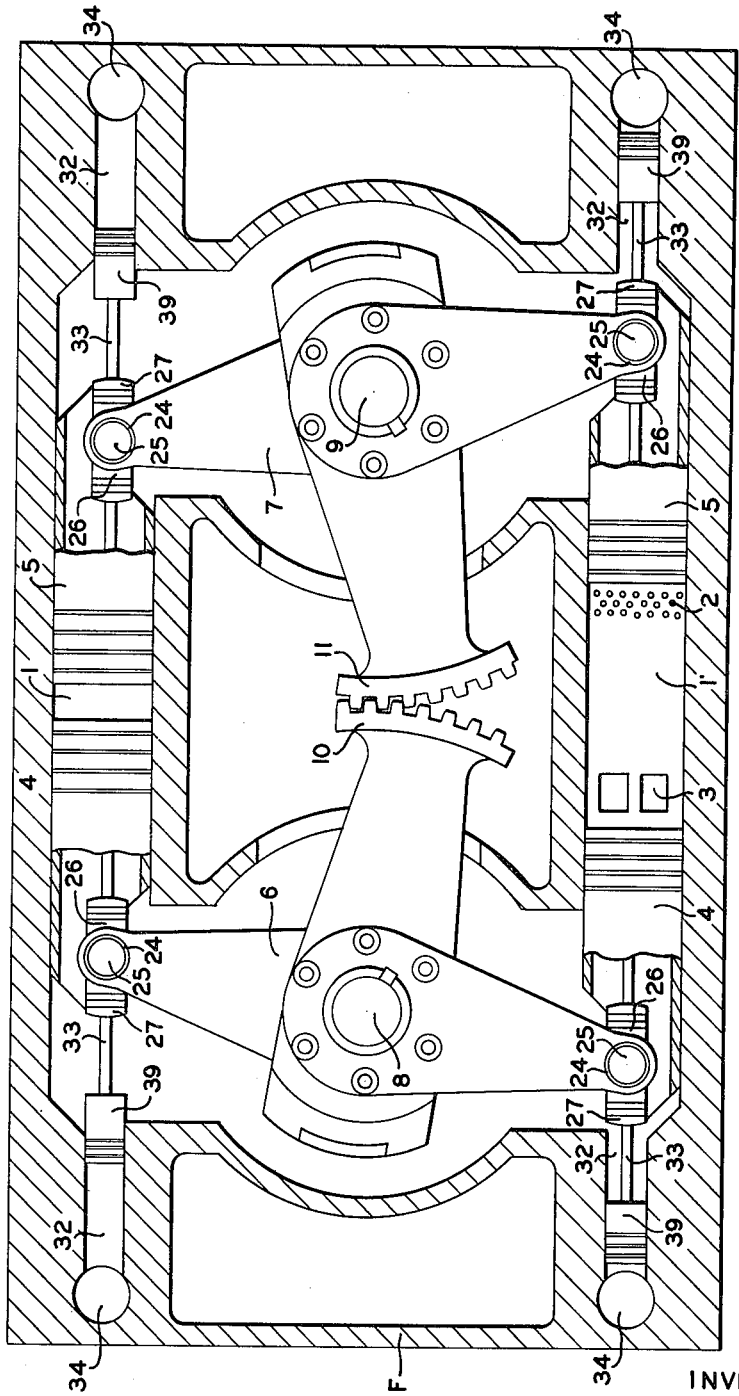
INVENTOR:
ERICH A. WACHSMUTH
BY
ATTORNEY

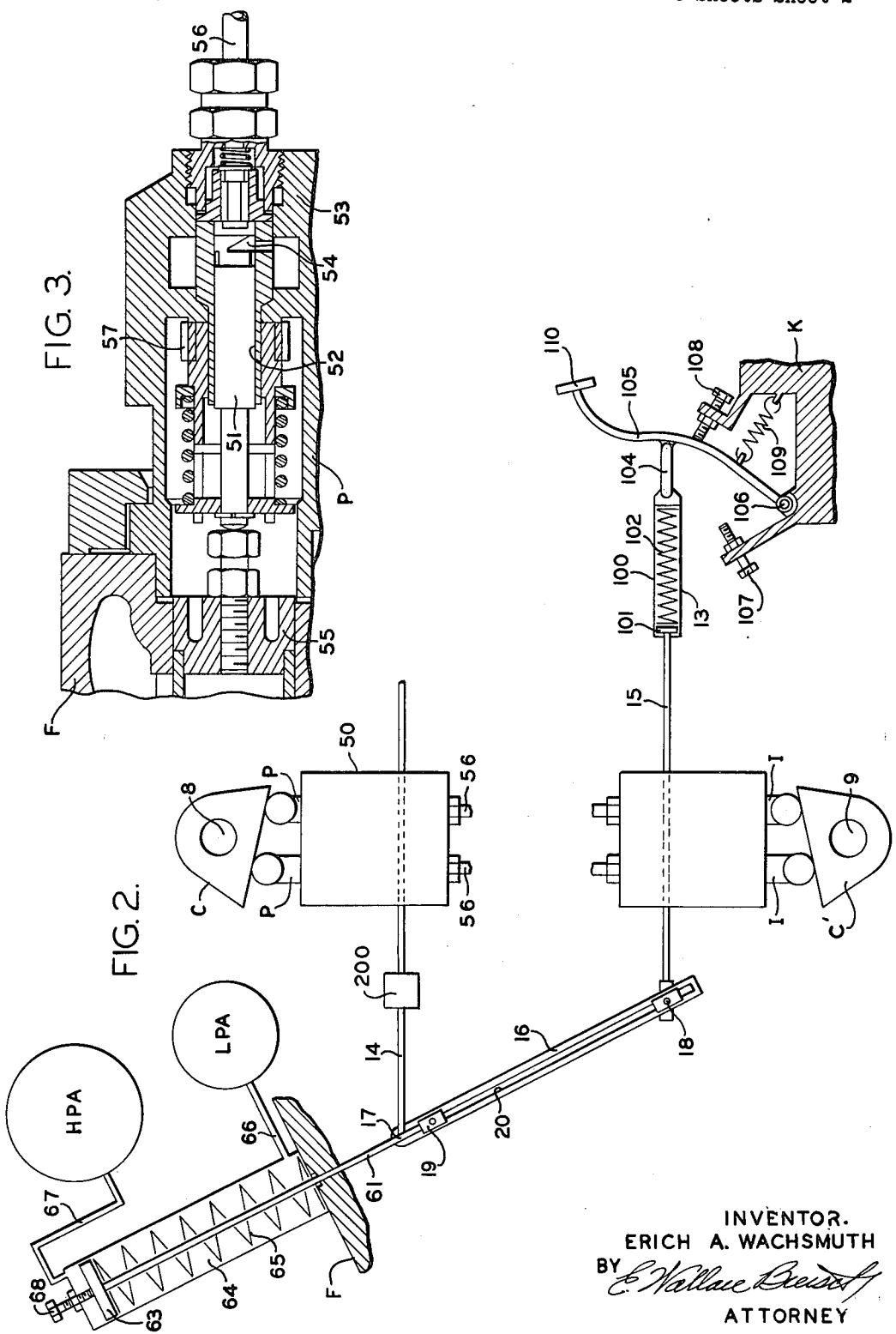

Aug. 10, 1965   E. A. WACHSMUTH   3,199,456
VEHICLE AND CONTROL SYSTEM THEREFOR
Filed July 12, 1960   6 Sheets-Sheet 3
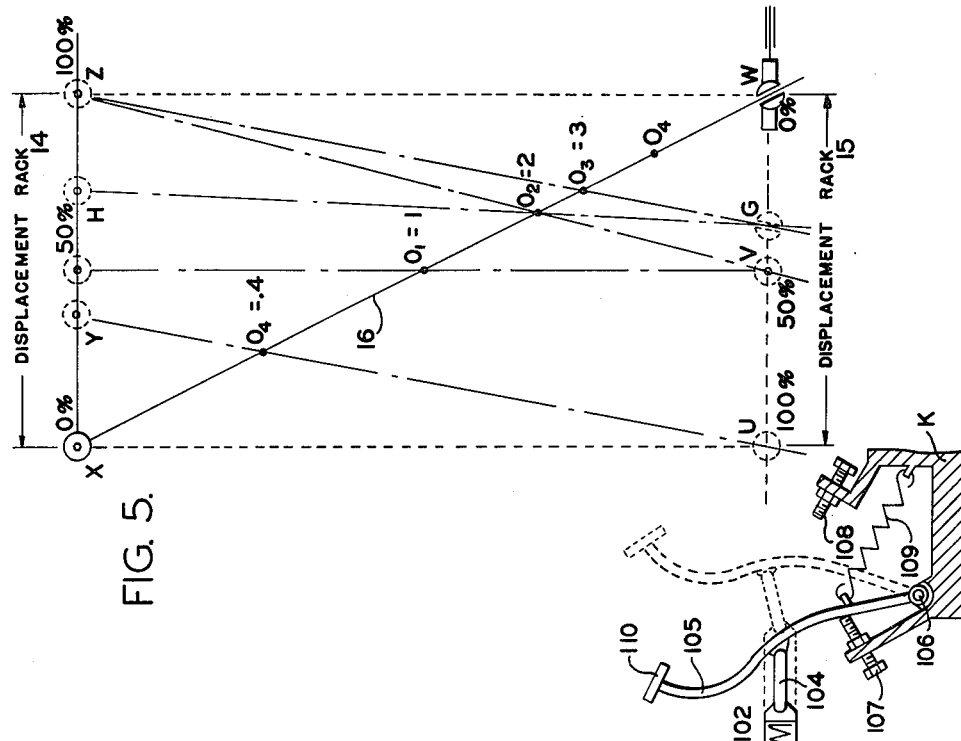
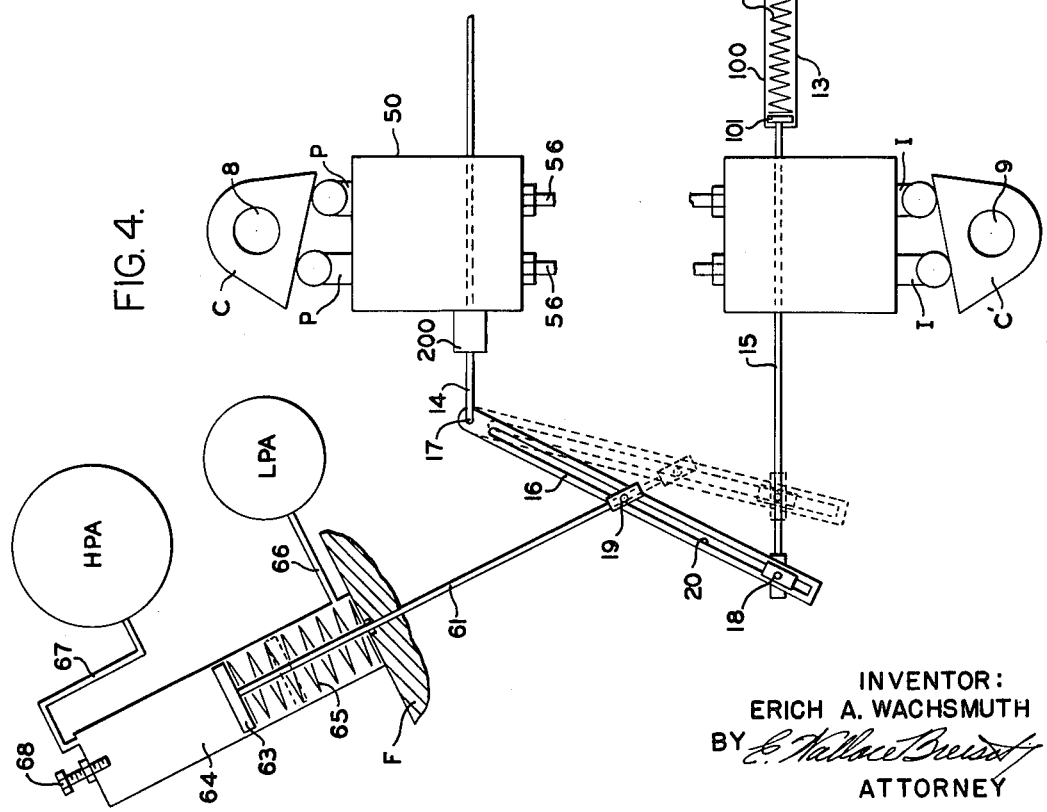
INVENTOR:
ERICH A. WACHSMUTH
ATTORNEY

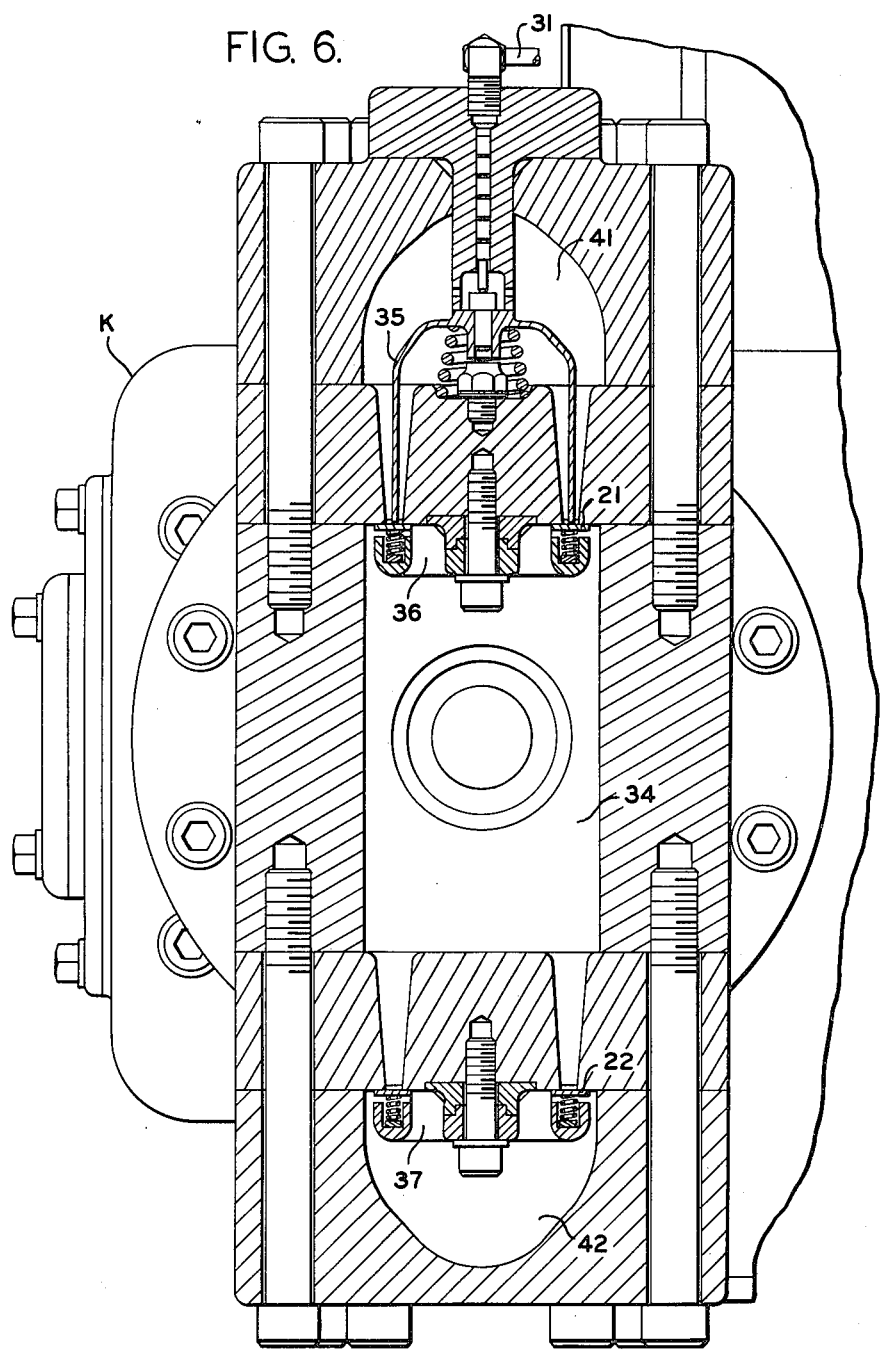

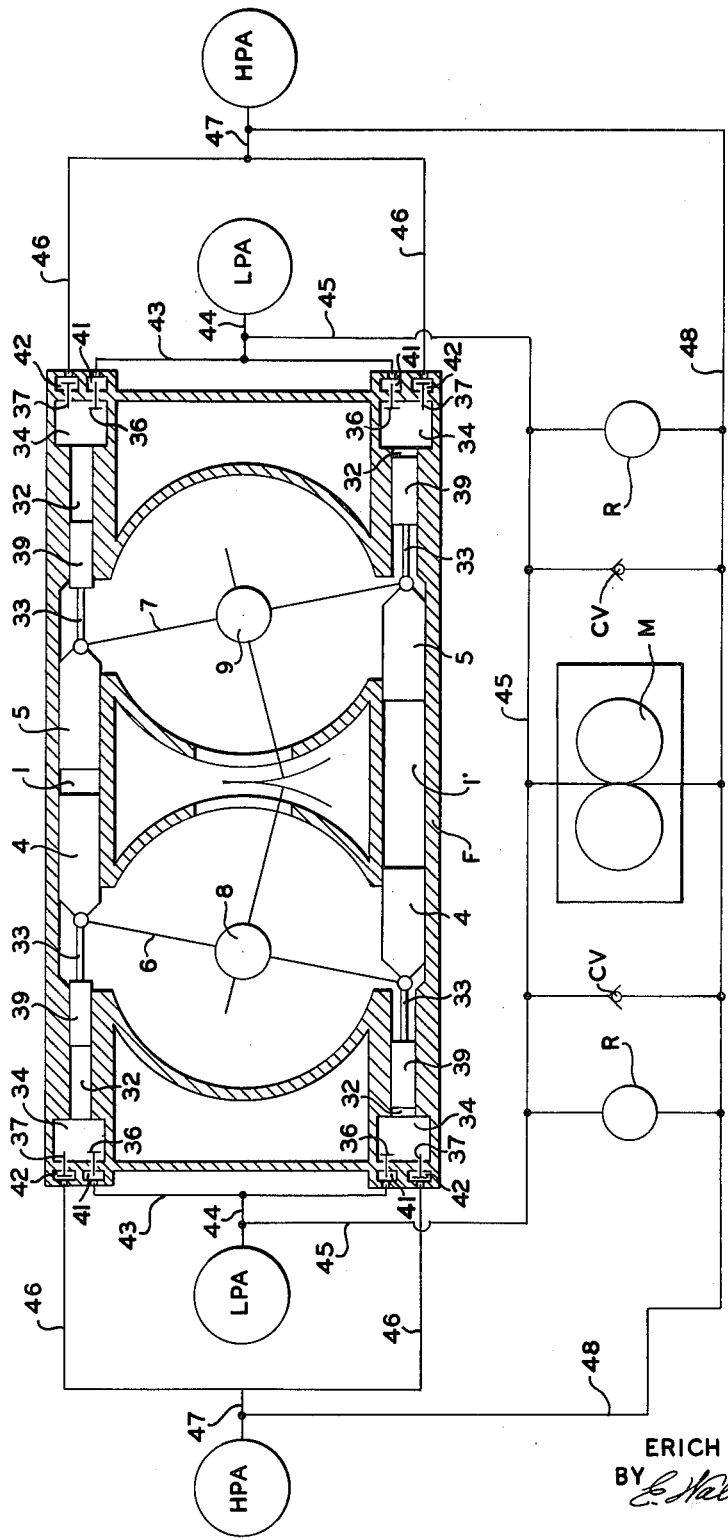

Aug. 10, 1965  E. A. WACHSMUTH  3,199,456
VEHICLE AND CONTROL SYSTEM THEREFOR
Filed July 12, 1960  6 Sheets-Sheet 6

INVENTOR:
ERICH A. WACHSMUTH
BY *E. Wallace Brensch*
ATTORNEY

United States Patent Office 3,199,456
Patented Aug. 10, 1965

3,199,456
VEHICLE AND CONTROL SYSTEM THEREFOR
Erich A. Wachsmuth, Long Beach, Michigan City, Ind.,
assignor to Joy Manufacturing Company, Pittsburgh,
Pa., a corporation of Pennsylvania
Filed July 12, 1960, Ser. No. 42,363
11 Claims. (Cl. 103—12)

This invention relates to a vehicle having a torque converting drive and more particularly to a system for controlling the amount of fluid displaced by a counterstroke free piston engine pump in response to the variations in demand on the pump portion such as the variations in traction effort required by a vehicle.

Although the control system described herein can be employed to control the admission of fuel or the energy medium to various types of engines, it is particularly adapted for use with a free piston engine pump of the counterstroke type. In the counterstroke engine the work stroke of one pair of opposed pistons causes the compression stroke of the other pair of pistons and vice versa and in such an engine it is essential that sufficient fuel be supplied to each working stroke to prevent the engine from stalling. A control system according to this invention adjusts the power input to the output of the engine pump until a maximum is reached and after the maximum power input has been reached the engine pump adjusts the amount of fluid displaced according to the effective discharge pressure while the maximum power input is maintained. A most important feature of this invention is to provide a control means which insures that the proper amount of fuel is supplied to the engine portion over the entire operating range of power output of the pump. Such a control system and engine pump are particularly desirable for powering a vehicle.

Accordingly, one object of this invention is to provide a new and improved vehicle having a torque converting drive.

Another object of this invention is to provide a new and improved control circuit for controlling the energy admission to a prime mover.

Another object of this invention is to provide a new and improved control circuit for a counterstroke type engine pump.

Another object of this invention is to provide a new and improved control circuit for a counterstroke type engine pump wherein the pump output controls the fuel admission to the engine in cascade with the initial fuel setting.

A more specific object of this invention is to provide a new and improved control for a free piston engine pump which is actuated by the pressure differential existing across a device which is subject to the pump portion of the engine pump.

A specific object of this invention is to provide a new and improved control for a free piston engine pump whereby under certain operating conditions the horsepower output of the engine portion remains constant and the discharge pressure and the discharge capacity of the pump portion are dependently variable so that the engine pump has the characteristic of a torque converter.

Another specific object of this invention is to provide a new and improved control for a free piston engine pump which supplies fuel to the engine portion in proportion to the variations in load under certain operating conditions and which varies the discharge capacity of the pump portion under other variations in load conditions.

Still another object of this invention is to provide a new and improved vehicle having a counterstroke free piston engine pump as the prime mover therefor.

A more specific object of this invention is to provide a new and improved vehicle having a prime mover therefor which includes a pump and capacity output controls therefor so that when the prime mover is below full load the pump output is manually controlled and when the prime mover is operating under full load the pump output is automatically controlled so that the prime mover has an operating characteristic of a torque converter.

Still another more specific object of this invention is to provide a new and improved control for a free piston engine pump which has dependent movable means for controlling the fuel supplied to the engine portion and for controlling the quantity of fluid discharged by the pump portion, respectively, which movable means are connected by means which is positionable in response to a pressure differential existing in a system subject to the discharge of the pump portion.

A more specific object of this invention is to provide a new and improved control for a free piston engine pump having means for varying the fuel supplied to the engine portion which means is positionable in response to the pressure differential existing in a system subject to the discharge of the pump portion.

A further specific object of this invention is to provide a new and improved control for a free piston engine pump which has means for controlling the fuel supplied to the engine portion which control also includes means for varying the quantity of fluid discharged by the pump portion while the means for controlling the fuel supplied as in the maximum fuel supply position.

Figure 8:
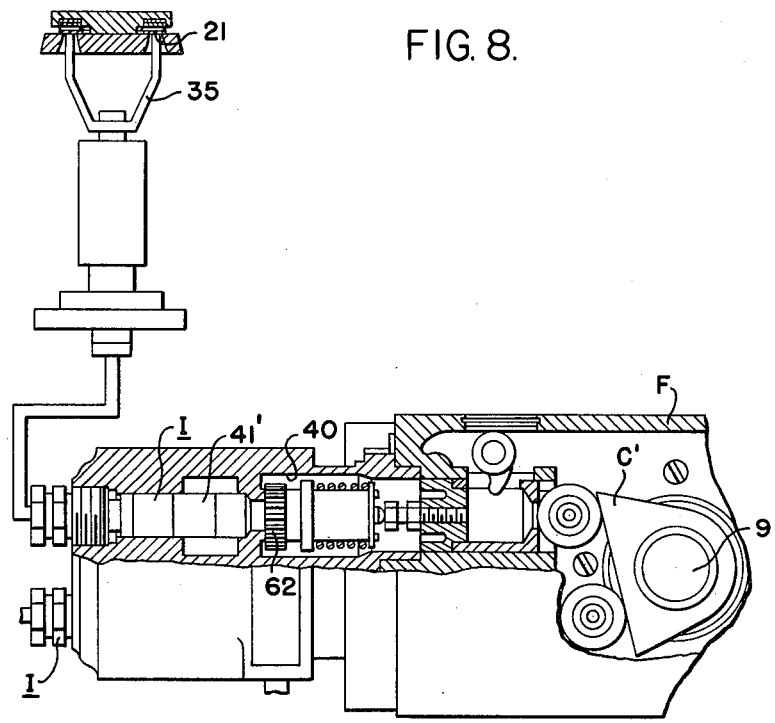

These and other objects of this invention will become more apparent upon consideration of the following detailed description of a preferred embodiment thereof, when taken in conjunction with the following drawings, in which:

FIG. 1 is a longitudinal cross sectional view of a free piston engine pump with portions thereof shown in elevation, FIG. 2 is a kinematic diagram of a control system constructed in accordance with the principles of this invention and the controls for the free piston engine pump as shown in FIG. 1, FIG. 3 is an enlarged cross sectional view of a fuel pump employed in the free piston engine pump as shown in FIG. 1, FIG. 4 is a diagram similar to FIG. 2 showing the control linkage in a different operating position, FIG. 5 is a kinematic diagram of the operating positions of the control linkage as shown in FIGS. 2 and 4, FIG. 6 is an enlarged fragmentary cross sectional view of the pump chamber of the free piston engine pump as shown in FIG. 1 and the inlet and discharge valves thereto, FIG. 7 is a diagrammatic representation of the free piston engine pump shown in FIG. 1 and the hydraulic control system connected thereto, FIG. 8 is a partial side elevational and partial cross sectional view of the control apparatus for the engine pump shown in FIG. 1 showing an impulse giver connected to a valve control mechanism; and, FIG. 9 is a diagrammatic representation of a vehicle constructed in accordance with the principles of this invention.

For the purpose of best understanding this invention the control system is described for the purpose of controlling the movement of a vehicle driven by a counterstroke free piston engine pump by controlling the quantity of fluid discharged by the pump portion of the engine pump. As shown in FIG. 1, such a free piston engine pump comprises a frame F having a pair of adjacent substantially parallel elongated engine cylinders 1, 1' in which a pair of opposed pistons 4, 5 are reciprocable therein, respectively. The reciprocable movement of the pistons 4 and 5 controls scavenging slots 2 and exhaust slots 3 located in the walls of the engine cylinders 1, 1', respectively. The pistons 4–4 and 5–5 are coupled in pairs by means of elongated double armed rockers 6 and 7 respectively, so that the outward travel or the working stroke of one pair of pistons 4–5 in one cylinder 1 or 1' occurs with the inward travel or compression stroke of the other pair of pistons 4–5 in the other cylinder 1 or 1' and vice versa. The rockers 6 and 7 are centrally pivotably supported on the frame F by suitable rocker shafts 8 and 9 and are connected to each other by means of integral laterally extending intermeshed gear segments 10 and 11 respectively, to maintain all the pistons 4 and 5 in synchronism. Each outer end of each rocker 6 and 7 is provided with a suitable cooperable bearing 24 and pin 25 which is supported in a block element 26 which is slidable in a suitable guide 27.

The frame F is also provided with elongated pump cylinders 32 located outwardly adjacent the ends of the engine cylinders 1, 1', respectively, which are coaxial with and open towards the adjacent cylinders 1 or 1'. Each of the cylinders 32 has an individual piston 39 reciprocably mounted therein which is suitably connected to the engine piston 4 or 5 adjacent thereto by means of a suitable elongated connecting rod 33. Each rod 33 has a guide 27 suitably connected thereto so that the shafts 8 and 9 have an oscillating motion derived from the alternating reciprocating movement of the piston pairs 4–5. For a more complete description of the operation of such a free piston engine, reference is made herein to Patent No. 2,841,322 and Reissue Patent No. 24,522.

As described hereinafter the pump pistons 39 periodically pump any suitable fluid, which for the purposes of describing this invention shall be considered as a hydraulic fluid, from the pump cylinders 32 to outer chamber portions 34, located in the frame F outwardly adjacent and open to the pump cylinders 32, respectively. As shown in FIG. 6, the frame F has pairs of spaced chambers 41 and 42 laterally outwardly adjacent the chamber portions 34, respectively, which chambers 41 and 42 are selectably connected to the chamber portion 34 adjacent thereto by suitable inlet and outlet valves 36 and 37, respectively. Such inlet valves 36 and outlet valves 37 are well known in the art so that description thereof is not believed to be necessary. It will be noted, however, that the inlet valve 36 has a movable spring biased disc or annular member 21 for opening and closing the opening between the chamber 41 and the chamber portion 34 and that the outlet valve 37 has a movable spring biased disc or annular member 22 for opening and closing the opening between the chamber 42 and the chamber portion 34. Such members 21 and 22 are part of such well known valves and function to control the admission and discharge of fluid to and from the chamber portion 34, respectively in the manner as hereinafter described. In addition the member 21 is also mechanically held in its open position by a suitably extendable hydraulic mechanism 35, as is well known in the art, having movable finger portions engageable with the member 21 so that the chamber 41 is selectably connected to the chamber portion 34. Although the actual structure of the chambers 41 and 42 has been shown adjacent one chamber portion 34, it will be realized that such structure is adjacent each chamber portion 34. For the purpose of clarity the chambers 41 and 42, the valves 36 and 37 have been shown diagrammatically only in FIG. 7. For a more detailed disclosure of such valves and a mechanism 35 see Patent No. 2,841,322 and Reissue Patent No. 24,522.

Fuel is supplied to the engine cylinders 1, 1' by a suitable fuel control device 50, see FIGS. 2 and 3, having a pair of identical fuel injection pumps P located adjacent each other. The construction of the pumps P are of a conventional form wherein the quantity of fuel delivered is adjusted or varied in accordance with well known metering means. (See for example Serial No. 697,012, filed November 18, 1957, now U.S. Patent No. 3,034,441, which application as all other pending applications identified herein has been assigned to the same assignee as this invention.) Each pump P comprises a housing 53 having an elongated bore 52 therein in which bore 52 an elongated plunger 51 is reciprocably mounted. As is well known in the art the plunger 51 of each pump P has a slanted control edge 54 and the pump plunger 51 is rotatable by a rotating gear 57 secured thereto which gear 57 is driven by an elongated rack 14, so that the quantity of fuel delivery by each pump P can be controlled.

The rack bar 14 rotates the pump plungers 51 about their longitudinal axes in a manner to vary the fuel delivery of the pumps between a maximum and zero. In this description the terms left, leftward, right, rightward, upward and downward are employed to concisely describe the operation of this invention; however, it should be particularly noted that such terms are to facilitate the description and are not required per se for operation of the invention. In addition, such terms apply only to FIGS. 2 and 4. As will become more apparent hereinafter, the rack 14 is moved rightward and leftward to properly increase and decrease the fuel pumped by each of the pumps P, respectively. The plungers 51 are reciprocated in alternation by means of an oscillating cam C which engages the outer ends of the plungers 51 and is connected to and derives its oscillating motion from the shaft 8. The compression strokes of the plungers 51 alternately inject fuel into the motor cylinders 1, 1' on the compression strokes of the pistons 4–5 via high pressure discharge conduits 56 and through the injection nozzles (not shown). Again Patent No. 2,841,322 and Reissue Patent No. 24,522 are referred to for a more complete description of the structure for supplying fuel.

In order to vary the delivery of the pressurized fluid from the pump cylinders 32, the members 21 of the inlet valves 36 are controlled through the mechanisms 35, respectively, by a pair of impulse givers I, see FIGS. 2 and 8. Each impulse giver I comprises an elongated housing having an elongated bore 40 therein in which bore 40 an elongated plunger 41' is reciprocably mounted. The plungers 41' are reciprocated in alternation by means of an oscillating cam C which engages the outer ends of the plungers 41' and is secured to the shaft 9 in a manner similar to that in which the cam C is connected to the shaft 8 and drives the plunger 41'. As is well known in the art, the plunger 41' has a control edge (not shown) for the purpose of determining the duration of the hydraulic impulse which impulse controls the operation of the finger mechanism 35. The impulse giver plungers 41' are rotatable about their longitudinal axes by rotating gear 62 secured thereto which gear 62 is driven by an elongated rack 15, so that the duration of the hydraulic impulse can be controlled with respect to the discharge or work stroke of the pump pistons 39 between a maximum and a minimum. The detail of the structure whereby the plungers 41' are actuated is more clearly shown in FIG. 8 and is more fully described in Patent No. 2,841,322 and Reissue Patent No. 24,522. For the purposes of this invention the impulse givers I may be be of any suitable structure, however, the structure shown described and claimed in the copending patent application Serial No. 697,012 is more particularly suited for this invention and accordingly reference is made to more fully understand the structure and operation of the impulse givers I. As will become more apparent hereinafter, the rack 15 is moved leftward and rightward (see FIGS. 2 and 4) to linearly decrease and increase, respectively, the length of time or duration that the mechanisms 35 hold the members 21 open during the work stroke of a pair of pistons 4 and 5.

As shown in FIGURE 7, the high pressure discharge chambers 42 at each end of frame F are connected to suitable conduits 46 which are connected to suitable conduits 47, respectively. The conduits 47 are connected to suitable high pressure accumulators HPA, respectively. Similarly, the chambers 41 at each end of the frame F are connected to suitable conduits 43 which are connected to suitable conduits 44, respectively. The conduits 44 are connected to suitable low pressure accumulators LPA, respectively. Although individual low pressure accumulators LPA and high pressure accumulators HPA are shown adjacent each end of the frame F and separate conduits 46, 47, 43 and 44, if desired, a single low pressure accumulator and a single high pressure accumulator may be employed which are connected to a single set of conduits 43, 44 and 46, 47, connected to all the chambers 41, 42, respectively. The conduits 47 are connected by means of suitable conduits 48 to the high pressure input side of a suitable hydraulic motor M (see also FIG. 7). It will be realized, however, that if a medium other than a hydraulic fluid is employed, a device operable by the fluid involved would be employed rather than the hydraulic motor M. The low pressure discharge side of the motor M is suitably connected to a suitable conduit 45 which in turn is connected to the low pressure conduits 44. Thus it will be noted that a closed hydraulic circuit is provided between the inlet and discharge sides of each of the hydraulic pumps 39. If desired, in order to establish a maximum operating pressure for the high pressure accumulator HPA, suitable relief valves R as are well known in the art may be provided between the high pressure conduit 48 and the low pressure conduit 45. Such structure provides a high pressure portion from the high pressure discharge side of the pistons 39 (chambers 42) to the motor M and a low pressure portion from the discharge side of the motor M to the low pressure side of the pistons 39 (chambers 41). Also, although a single motor M is shown and described heretofore, if desired a plurality of motors may be connected between such high and low pressure portions of the hydraulic system.

Referring to FIGURES 2 and 4, the rack bar 14 is pivotably connected at its left end by suitable pivot means 17 to the upper end of an elongated transmission link 16. The transmission link 16 is provided with a suitable longitudinally elongated guideway 20 and has a suitable block 18 at the lower end thereof which block 18 is slidable longitudinally therein. As shown, the rack 15 is suitably pivotably connected to the block 18 so that the rack 15 is linearly movable leftward and rightward regardless of the position of the link 16 with respect to the rack 15. In order to limit the travel of the rack 14 a suitable stop 200 is rigidly located thereon which engages the control device 50 (see FIG. 4) when the rack 14 has travelled its maximum desired rightward distance. The right end of the rack 15 remote from the block 18 is connected to a linkage 13 which linkage 13 comprises an elongated closed end tubular housing 100 which extends axially with respect to the rack 15. The right end of the rack 15 extends freely through an opening in the adjacent end of the housing 100 and is provided with a laterally enlarged head portion 101 inside the housing 100 which is closely slidably received in the bore of the housing 100. The head portion 101 is biased, as hereinafter described, towards the link 16 by means of a suitable elongated coil spring 102 which extends between the head 101 and the end of the housing 100 remote from the link 16. In order to move the housing 100 axially the end thereof remote from the link 16 is connected by means of a suitable link 104 to an intermediate portion of a pivotable foot link 105. Although the link 104 may be of various suitable structures it is preferably suitably pivotably secured to the housing 100 at one end and suitably pivotably secured to the foot link 105 at the other end.

As more fully described hereinafter, the engine structure described heretofore is particularly useful for powering a vehicle (see FIG. 9) having a frame K. In order to provide a manual control for the engine one end of the link 105 is suitably pivotably connected to the frame K by suitable pivot means 106 and the other end thereof is provided with a suitable foot pad 110. A suitable elongated coil spring 109 is provided which extends between the frame K and the foot link 105 to bias the foot link 105 away from the link 16. In order to limit the movement of the foot link 105 around the pivot 106 suitable adjustable stops 107 and 108 are provided on the frame K on opposite sides of the foot link 105 which are engageable therewith upon movement in opposite directions, respectively.

The transmission link 16 is also provided with a suitable block 19 which is slidably received in the guideway 20 so as to be reciprocably slidable between the pivot means 17 and the block 18. Block 19 is suitably pivotably connected to an elongated rod 61 which extends outwardly beyond the link 16 with its outer end being rigidly secured to a piston 63. The piston 63 is reciprocably received in a suitable elongated cylinder 64 which is rigidly supported with respect to the frame F in any suitable manner such as by being anchored to the frame F or the frame K. As shown, the piston 63 is biased upwardly with respect to the link 16 by means of a suitable elongated coil spring 65 in the cylinder 64 which extends between opposed surfaces of the piston 63 and the cylinder 64. A suitable passageway 67 is connected to the cylinder 64 at the end thereof remote from the link 16 and a suitable passageway 66 is connected to the cylinder 64 between the piston 63 and the end thereof adjacent the link 16. Passageways 67 and 66 are connected to one or both of the high pressure accumulators HPA and the low pressure accumulators LPA, respectively. In order to variably limit the travel of the piston 63 outwardly from the link 16 a suitable adjustable stop 68 may be provided which extends inwardly from the high pressure end of the cylinder 64 whereby the position of the piston 63 under idle load condition when no pressure differential, as hereinafter described, exists between the accumulators HPA and LPA, can be adjusted. With such structure the piston 63 is reciprocated in the cylinder 64 in response to pressure differentials existing between the high pressure accumulator HPA and the low pressure accumulator LPA so that the rod 61 reciprocates along its longitudinal axis. Accordingly, the block 19 and the guideway 20 of the transmission link 16 are of a structure to permit the block 19 to reciprocate along the longitudinal axis of the rod 61 in response to the reciprocation of the rod 61. In addition, it will be realized that the piston 63 and cylinder 64 structure described is only illustrative of one mechanical system for producing such reciprocable movement of the block 19 and that if desired other mechanical systems may be employed. Other such mechanical systems may well be employed when large pressure differentials are involved.

It is believed that this invention is best understood by being described with reference to a specific vehicle application; however, it will be realized that this invention has application to other than vehicle drives. Thus, FIG. 9 diagrammatically illustrates such a vehicle having the frame K which supports the free piston engine-pump and the controls therefor as heretofore described. The high and low pressure accumulators HPA and LPA are also supported by the frame K and are connected to the free piston engine pump in the manner heretofore described. As shown, each wheel W of the vehicle is suitably connected to the output shaft of the transmissions which are driven by motors M respectively which motors M are driven by the high pressure fluid discharged by the engine pump through the accumulators HPA. For the purposes of this invention the wheels W may be of any suitable structure as is well known in the art. If desired, a single motor M may be used to drive a single wheel axle (not shown) having a plurality of wheels W suitably connected thereto. Although only one motor M was heretofore described, FIG. 9 shows that a plurality of motors M may be employed, if desired.

With such a vehicle structure it will be realized that with varying terrain the drag on the wheels W will vary so that the torque output to the wheels W will vary in order to obtain movement of the vehicle by overcoming such varying drag. No movement of the vehicle will occur until a sufficient quantity of hydraulic fluid at sufficient hydraulic pressure is delivered to the motors M to cause the motors M to rotate and overcome the pull on the wheels W. Thus, the pull on the wheels W determines the pressure at which hydraulic fluid must be supplied to the motors M to cause movement of the vehicle. As indicated, the motors M and the high pressure accumulators HPA are directly connected together in the high pressure portion of the hydraulic circuit. Thus, the high pressure hydraulic fluid discharged by the piston 39 can flow to either the motors M or the high pressure accumulators HPA depending on the quantity of high pressure hydraulic fluid required for operation by the motors M. Thus, if a greater quantity of hydraulic fluid is discharged by the pistons 39 at the required pressure to the high pressure portion than is necessary for maintaining movement of an already moving vehicle, the pressure in the high pressure accumulators and the vehicle speed will increase until a new equilibrium is achieved between the capacity of the engine pump and the speed of the vehicle.

Before starting the engine the entire system is preferably in the position shown in FIG. 2 and, with no pressure differential existing on the opposite sides of the piston 63, the piston 63 is located adjacent the upper end of the cylinder 64. Under these conditions the block 19 is located at the upper end of the guideway 20 on the link 16. For the purposes of describing this invention it will be assumed that the pivot axes of the pivot means 17 and the block 19 are coincident, however, in practice it may be desirable to locate the pivot axis of the block 19 closely adjacent the pivot axis of the pivot means 17 on the block 18 side of the pivot axis of the pivot means 17. Such spacing of the pivot axis of the block 19 will not as a practical matter interfere with the operations of the control of this invention as hereinafter described. At the same time with the link 105 not being depressed, the spring 109 biases the link 105 to its full rightward position and consequently the housing 100 is located in its full rightward location. The spring 102 is fully extended and engages the head portion 101. Simultaneously the spring 109 biases the sliding block 18 into the position shown with respect to the link 16 through the engagement of the housing 100 with the head portion 101. Under these conditions the rack 14 is located with respect to the gear 57 of each of the pumps P so that the plungers 51 are located to sequentially supply sufficient fuel to the engine cylinders 1 and 1' so that the engine-pump will idle when no pressure differential exists on opposite sides of the piston 63. As will become apparent hereinafter, the engine-pump will idle regardless of the pressure differential on opposite sides of the piston 63 within the operating range of the described control. In addition, when the link 16 is in the location shown, the rack 15 is located with respect to the gear 62 of the plungers 41' of the impulse gives I so that hydraulic impulses of sufficient duration are delivered to the lift mechanisms 35 which sequentially hold the members 21 open during the pumping or outward stroke of the pistons 39 so that no discharge of fluid occurs into the high pressure portion of the system.

FIG. 5 graphically illustrates in spaced relationship the displacement of the racks 14 and 15 and the position of the link 16 with respect thereto. For the purposes of this invention the rack 15, when biased as indicated in its full rightward position, rotates the plungers 41' of the impulse givers I so that the plungers 41' are located to deliver a hydraulic impulse to the mechanism 35 of sufficient duration to hold the members 21 open throughout the entire work or pumping stroke of the pistons 39 (compressibility of the fluid 10 not considered in the description of this invention with reference to the impulse givers I). Accordingly, with the impulse givers I so located no fluid can be discharged to the high pressure portion of the system. Movement of the rack 15 to the left rotates the plungers 41' so that the duration of the hydraulic impulses to the mechanism 35 with respect to the pumping stroke of the pistons 39 decreases until at full leftward movement of the rack 15 the pistons 39 discharge fluid throughout their entire pumping stroke into the high pressure portion of the system. Thus, the displacement of the rack 15 also directly represents the variations in quantity of high pressure fluid discharged to the high pressure portion of the system by the pistons 39. When the rack 14 is initially located in its full leftward position shown so that as the rack 14 moves rightward from such initial position the quantity of fuel injected to the engine cylinders increases. Thus, the displacement of the rack 14 also directly represents the variations in quantity of fuel injected. It will be noted, however, that at zero dispacement of the rack 14 the plungers 51 of the pump P are located to provide sufficient fuel to the engine portion of the engine-pump so that proper idling will be assured.

After starting of the free piston engine (see for example Patent No. 2,841,322, Reissue Patent No. 24,522, Serial No. 697,012 and copending application Serial No. 10,692, now U.S. Patent No. 3,072,315) the link 105 is normally depressed which causes the housing 100 to be displaced towards the link 16. It will be realized that link 105 is depressed by an operator's foot in the same manner as known vehicles, such as an automobile accelerator pedal. Depression of the link 105 causes a corresponding movement of the rack 15 and the block 18 leftward so that the rack 15 is movable to the extreme leftward position or any intermediate position as desired. The spring 102 has a characteristic to permit such depression of link 105 and movement of rack 15 without permitting the head portion 101 to overcome the bias of the spring 102, and move towards the link 105 and still permit relative movement between the portion 101 and housing 100 as hereinafter described. Full leftward movement of the rack 15 causes the plungers 41' of the impulse givers I to be rotated so that the mechanisms 35 do not affect the operation of the members 21 and the members 21 are closed during the entire discharge stroke of the pistons 39 whereby fluid is discharged by the pistons 39 to the high pressure portion of the system.

Upon leftward movement of the rack 15 the pressure of the fluid discharged by the pistons 39 to the high pressure portion of the system increases until sufficient pressure is achieved in the high pressure portion to cause movement of the vehicle. Simultaneously such increase in pressure in the high pressure portion causes the piston 63 to be displaced downwardly so that the block 19 is displaced downwardly with reference to the link 16 and the rack 14 is displaced in a fuel increasing direction as the link 16 pivots about the pivot axis of the block 18. Such downward movement of the block 19 continues as the pressure in the high pressure portion increases as required to obtain the desired movement of the vehicle; however, a corresponding increase in fuel cannot continue after the stop 200 engages the pump 50. With full leftward movement of the rack 15 and with full rightward movement of the rack 14 in the full fuel position the high pressure portion is at the highest pressure which can be maintained at full fluid discharge of the pistons 39.

The pressure resulting in the high pressure portion under full fuel supply (100% fuel) and full fluid discharge is identified as the nominal pressure and at such condition the link 16 extends (see FIG. 5) from point U (100% displacement of rack 15) to point Z (100% displacement of rack 14) with the pivot axis of the block 19 being located at the center $O_1$ on the link 16.

Of particular note is the fact that movement of the rack 14 rightward, in a fuel increasing direction, is governed by the block 19 so that the proper amount of fuel is injected for each operating condition. Thus, if it is assumed that upon full leftward movement of the rack 15 the operating conditions require 40% fuel injection, the pivot center of the block 19 is at a center $O_4$ (see FIG. 5) on the link 16 and the link 16 extends from the point U of full displacement of the rack 15 through center $O_4$ and the point Y on the displacement curve of the rack 14 which point Y represents 40% fuel injection. The fact that the proper amount of fuel is injected is better realized when it is considered that the triangles $XO_4Y$ and $UO_4W$ are similar so that a line origination at any point on the line WU which passes through center $O_4$ divides the line XY in the same ratio as the line UW is divided. Thus, as the rack 14 moves from X to Y and as the rack 15 moves from W to U there is a range of operating positions during which period the amount of fuel injected into the cylinders 1, 1' increases linearly as the total fluid displaced by the pistons 39 increases.

Forty percent fuel injection is only one specific operation condition and with the structure described the fuel injected by the pumps P increases or decreases linearly for each position of the block 19 with respect to the link 16 providing the rack 14 has less than its full rightward displacement, that is, as long as less than the full capacity of the fuel pumps P is injected into the cylinders 1, 1'. It will be realized that with the described structure the maximum quantity of fluid can be discharged by the pistons 39 with the rack 15 at any operating position and that any quantity of fuel between that required for idling and the maximum quantity dischargeable can be discharged by the pistons 39 with the rack 15 at its corresponding operating position. However, when maximum quantity of fluid is discharged by the pistons 39 the fuel required by the engine pump is not necessarily the total fuel output of the pumps P. Once the engine receives the maximum fuel input, the maximum power output per stroke is obtained.

Under many operating conditions the pull on the wheels W requires a higher pressure fluid than the nominal pressure so that block 19 is displaced downwardly from the center $O_1$. When a higher tractive effort is required at the wheels, even though the vehicle engine is not capable of a higher power output, the engine pump is capable of delivering fluid at a higher pressure than the pressure of the fluid at the nominal operating position; however, pressures in the high pressure portion of the system higher than the nominal pressure can only be accomplished when the amount of fluid discharged into the high pressure portion is less than the full capacity of the engine pump. In order to accomplish this purpose the over travel spring 102 and the related structure has been provided which allows a leftward movement of rack 15 against the manually given command by the link 105.

As such pressure differential increases across the piston 63 after the nominal pressure has been reached, the pivot center of the block 19 with respect to the link 16 moves further downwardly from $O_1$ with the engine still receiving the maximum amount of fuel, in order that the engine pumps can deliver the required high pressure fluid for a portion of the pumping stroke of the pistons 39. Such downward movement of the block 19 causes the link 16 to pivot about the pivot 17 (see FIG. 4) and move the block 18, rack 15 and head portion 101 against the bias of the spring 102 into the housing 100 so that the rack 15 rotates the plungers 61 of the impulse givers I in a direction so that the amount of fluid discharged into the high pressure portion by the pistons 39 per pumping stroke is decreased by means of the mechanisms 35 (see FIG. 6) moving the members 21 so that the low pressure chambers 41 and the chamber portions 34 are connected during a portion of the pumping stroke of the pistons 39, respectively. Still further increases in the traction effort to drive the vehicle requires still higher pressure fluid so that the pressure differential between the high and low pressure portions of the fluid discharged by the pistons 39 can theoretically increase with full fuel injection until the fluid discharge is substantially zero, the pressure of the fluid discharged by the pistons 39 would approach infinity. Accordingly, a pressure ratio of 4:1 is selected for the torque conversion range as a practical limitation so that the components subjected to the highest pressure are capable of withstanding such highest pressure. The highest pressure in the high pressure portion of the system is limited by the relief valves R. Thus, depending upon the selected pressure setting of the relief valves R when the selected pressure is reached the valves R open to connect the high and low pressure portion of the system so that the entire system will continue to operate. If an emergency shut down device in case of excessive pressure were desired a suitable stop may be provided to limit the movement of the block 19 with respect to the link 16.

Thus the control permits operation of the machine at discharge pressure four times the nominal pressure whereby a torque conversion of four to one is obtained. Such torque conversion is best understood if the full fuel input-full fluid discharge position is considered in which the center of the block 19 with the link 16 is at the nominal pressure condition. Such condition is shown in FIGURE 4. It is realized that for an accurate analysis machine losses must be considered; however, they are disregarded here for simplicity of explanation. The work output of the engine is however the product of the mean pressure difference between discharge and inlet multiplied by the quantity of fluid discharged. Thus, power input=output capacity×mean pressure difference (discharge and inlet)

or under full fuel-full fluid discharge $$100\% = 100\% \times p$$

a discharge pressure of $p=1$ is obtained.

Thus, if full fuel is still supplied but the fluid discharged is reduced in half, using the same formula $$100\% = \frac{1}{2}(100\%) \times p$$

a discharge pressure of $p=2$ is obtainable, if such pressure is required.

Similarly, if full fuel is still supplied but the fluid discharged is reduced ⅔ from full discharge, using the same formula:

$$100\% = \frac{1}{3}(100\%) \times p$$

a discharge pressure of $p=3$ is obtainable, if such pressure is required.

Thus the discharge pressure varies from the nominal pressure to some practical limit which depends on the physical limitations of the materials employed for the machine and the components.

When the engine pump is functioning as a torque converter and the operator wishes to reduce the speed of the vehicle, it is only necessary to release the link 105 so that the fluid displaced by the pistons 39 is reduced. Since the block 18 is consequently moved rightward and no pressure change has occurred in the cylinder 64, the block 19 remains stationary and the rack 14 will be moved in a fuel reducing direction while the pressure in the high pressure portion of the system is maintained. Thus, the structure of this invention insures that the proper amount of fuel is injected with relation to the load requirements. Although exact fuel control is obtained with the described structure it is to be realized that, within a range, an oversupply or undersupply of fuel does not affect the operation of the engine pump when suitable additional control means are employed such as those shown in Patent No. 2,919,685.

As indicated, after the engine pump is operating at pressures higher than the normal pressure and with maximum fuel being supplied, the control rack 15 is moved rightward in a direction to reduce the quantity of fluid discharged by the pistons 39 to the high pressure portion of the system. Simultaneously, assuming the link 105 is fully depressed, the spring 102 has been compressed by the rightward movement of the rack 15 so that the head portion 101 is spaced from the bottom of the housing 100. Accordingly, when the operator releases the pressure on the link 105 the spring 109 moves the housing 100 toward the head portion 101; however, such release of the link 105 will be of no effect until the housing 100 engages the head portion 101. After such engagement the operator can again control the quantity of fuel injected by further release of pressure on the link 105. Assuming that the vehicle requires a pressure in the high pressure portion of the system equal to twice the nominal pressure and full fuel is supplied, the pivot axis of the block 19 is at $O_2$ and the link 16 extends (FIG. 5) along the line $VO_2Z$. Assuming also full depression of the link 105, the release of the link 105 by the operator is ineffective to accomplish any control function until link 105 has traveled, due to the bias of spring 109, to its midpoint operating position at which time the housing 100 engages the head portion 101. After such engagement further release of the link 105 will through the bias of spring 109 cause the rack 14 to move around to the pivot axis $O_2$ in a fuel decreasing direction and the rack 15 to simultaneously move around the pivot axis $O_2$ in a direction to reduce the quantity of fluid discharged to the high pressure portion of the system so that the required operating pressure of twice the nominal pressure is still maintained while insuring that the proper amount of fuel for such operation is supplied. Thus, the link 16 pivots about the center $O_2$ to a new operating position shown illustratively as $GO_2H$. In such position it will be noted that less than full fuel is supplied so that fuel is again supplied linearly with reference to the load condition and the vehicle speed is directly controlled by the operator. Since less than full fuel is supplied, as the torque required to obtain the desired vehicle operation increases, the fuel supplied is increased by a further downward movement of block 19 until full fuel output is achieved. Upon reaching full fuel output the engine pump again has the characteristic of a torque converter.

It will be appreciated that under normal operating conditions the operator will frequently remove the foot pressure from the link 105 (such as when applying the brakes to the vehicle). In many instances the inertia of the traveling vehicle is sufficient upon such release to cause the wheels W to drive the motors M as a pump so that fluid will be pumped from the high pressure portion of the system to the low pressure portion of the system. Such pumping can cause damage to the low pressure portion of the system and accordingly substable check valves CV are connected between the conduits 45 and 48 to permit such pumped fluid to flow from the motors M, through conduit 45, check valves CV, conduit 48 and back to the motors M.

Although the description heretofore has not considered the compressibility of hydraulic fluids, it is to be realized that this invention is not limited in use within the range of pressures in which the compressibility of a hydraulic fluid has little effect. When the compressibility of a hydraulic fluid becomes a factor in the operation of the engine pump it is necessary to design the controls to eliminate or substantially eliminate any effect due to such compressibility. Although as heretofore described the pivot axes of pivot means 17 and block 19 are coincident at idle load with no pressure differential in the system, a small displacement will not interfere with the proper functioning of the control. Thus, as shown, the pivot axis of the block 19 may be spaced slightly downwardly of the axis of the pivot means 17.

Another feature of this invention is the fact that the engine-pump is capable of developing maximum power output independently of the speed of the vehicle. Thus, assuming that the vehicle engages a solid barrier or that the vehicle brakes, as are normally supplied, are set, it is possible by depressing the link 105 to locate the plungers 41' of the impulse givers I so that the pistons 39 discharge hydraulic fluid to the high pressure portion of the system. Inasmuch as the wheels W cannot rotate, fluid is delivered to the high pressure accumulators until the maximum pressure of the high pressure portion is achieved. Although not described herein, reference to the copending application Serial No. 10,692 more fully describes the fact that normally the pressure in the low pressure portion does not affect the operation of this invention inasmuch as the operation described is dependent upon the pressure difference between the high and low pressure portions of the system. However, due to such pressurization of the low pressure portion it will be realized that the use of the terms high and low pressure in this description are only relative with reference to the pressure in the high and low pressure portion. Although as shown, the displacements of the racks 14 and 15 are equal it will be realized that the structure of this invention is equally applicable to pumps P and impulse givers I which do not have equal rotative movements of their plungers to vary the fuel supplied or the duration of hydraulic impulses, respectively.

Thus, the structure of this invention provides a control system which permits operation of a vehicle or other suitable machines at discharge pressures up to four times the normal pressure; in other words, perform a torque conversion of 4:1. The effective pump pressure P and the pump capacity V are interrelated by the Formula $P \times V = N$, as long as N, the pump output, is below full load. For this range N increases with P and/or V, whereby P is determined by prevailing torque requirements, and V is manually controlled by the machine operator. When the engine pump has reached its maximum output, the formula changes to $P \times V = $ Const., which is the characteristic equation of a constant output torque converter. This formula constitutes a reciprocable dependence between P and V, according to which an increase in pressure necessitates a respective decrease in capacity. To avoid overloading during this second control phase the pump capacity V is adjusted automatically by the effective pump pressure itself whereby the pressure initiated command overrides any conflicting manual command of the operator.

Having described a preferred embodiment of this invention in accordance with the patent statutes, it is to be realized that modifications thereof may be made without departing from the broad spirit and scope of this invention. Accordingly it is respectfully requested that this invention be interpreted as broadly as possible and as limited only by the prior art.

What I claim is:

1. Control apparatus for an engine driven pumping device comprising; a fuel consuming engine, a pressure fluid delivering pump driven by said engine, a fuel pumping means connected to deliver fuel to said engine, a regulator for varying the delivery rate of said fuel pumping means, a controller for varying the fluid delivery rate of said pump, means connecting said regulator and said controller for dependent simultaneous variation of said delivery rates, actuating means connected to said connecting means responsive to the pressure within a fluid discharged by said fluid pumping means for applying a variable ratio to said variation of said delivery rates as said pressure varies.

2. Control apparatus for an engine driven pumping device comprising: a fuel consuming engine, a pressure fluid delivering pump driven by said engine, a fuel pumping means connected to deliver fuel to said engine, a regulator for varying the delivery rate of said fuel pumping means, a controller for varying the fluid delivery rate of said pump, means connecting said regulator and said controller for dependent simultaneous variation of said delivery rates, actuating means connected to said connecting means responsive to the pressure within a fluid discharged by said fluid pumping means for applying a variable ratio to said variation of said delivery rates as said pressure varies and selectively operable means connected to said controller to cause movement thereof only before maximum fuel delivery rate is effected.

3. Control apparatus as specified in claim 2 wherein movement of said controller by said selectively operable means is prevented by said actuating means when said regulator is positioned for maximum fuel delivery rate.

4. Control apparatus for an engine driven pumping device comprising, a fuel consuming engine, a pressure fluid delivering pump driven by said engine, a fuel pumping means connected to deliver fuel to said engine, a regulator for varying the delivery rate of said fuel pumping means, a controller for varying the fluid delivery rate of said pump, elongated means connecting said regulator and said controller for dependent simultaneous movement, pivot means supported by said elongated means and movable longitudinally with respect thereto, said elongated means being pivotable about said pivot means, actuating means connected to said pivot means to cause said longitudinal movement of said pivot means, said actuating means being responsive to the pressure of a fluid discharged by said fluid pumping means so that said dependent movement has different ratios at different pressures of said fluid.

5. Control apparatus for an engine driven pumping device comprising, a fuel consuming engine, a pressure fluid delivering pump driven by said engine, a fuel pumping means connected to deliver fuel to said engine, a regulator for varying the delivery rate of said fuel pumping means, a controller for varying the fluid delivery rate of said pump, elongated means connecting said regulator and said controller for dependent simultaneous movement, pivot means supported by said elongated means and movable longitudinally with respect thereto, said elongated means being pivotable about said pivot means, actuating means connected to said pivot means to cause said longitudinal movement of said pivot means, said actuating means being responsive to the pressure of a fluid discharged by said fluid pumping means so that said dependent movement has different ratios at different pressures of said fluid and selectively operable means connected to said controller to cause movement thereof only before maximum fuel delivery rate is effected.

6. Control apparatus as specified in claim 5 wherein movement of said controller by said selectively operable means is prevented by said actuating means when said regulator is positioned for maximum fuel delivery rate.

7. Control apparatus for an engine driven pumping device comprising, a fuel consuming engine, a pressure fluid delivering pump driven by said engine, a pressure fluid operated device connected to said pump to receive pressure fluid discharged by said pump at a first pressure and to return pressure fluid to said pump at a second pressure substantially lower than said first pressure, a fuel pumping means connected to deliver fuel to said engine, a regulator for varying the delivery rate of said fuel pumping means, a controller for varying the fluid delivery rate of said pump, means connecting said regulator and said controller for dependent simultaneous variation of said delivery rates, actuating means connected to said connecting means responsive to the pressure difference between said first pressure and said second pressure for applying a variable ratio to said variation of said delivery rates as said pressure difference varies.

8. Control apparatus for an engine driven pumping device comprising, a fuel consuming engine, a pressure fluid delivering pump driven by said engine, a pressure fluid operated device connected to said pump to receive pressure fluid discharged by said pump at a first pressure and to return pressure fluid to said pump at a second pressure substantially lower than said first pressure, a fuel pumping means connected to deliver fuel to said engine, a regulator for varying the delivery rate of said fuel pumping means, a controller for varying the fluid delivery rate of said pump, means connecting said regulator and said controller for dependent simultaneous variation of said delivery rates, actuating means connected to said connecting means responsive to the pressure difference between said first pressure and said second pressure for applying a variable ratio to said variation of said delivery rates as said pressure difference varies and selectively operable means connected to said controller to cause movement thereof only before maximum fuel delivery rate is effected.

9. Control apparatus for an engine driven pumping device comprising, a fuel consuming engine, a pressure fluid delivering pump driven by said engine, a pressure fluid operated device connected to said pump to receive pressure fluid discharged by said pump at a first pressure and to return pressure fluid to said pump at a second pressure substantially lower than said first pressure, a fuel pumping means connected to deliver fuel to said engine, a regulator for varying the delivery rate of said fuel pumping means, a controller for varying the fluid delivery rate of said pump, elongated means connecting said regulator and said controller for dependent simultaneous movement, pivot means supported by said elongated means and movable longitudinally with respect thereto, said elongated means being pivotable about said pivot means, actuating means connected to said pivot means to cause said longitudinal movement of said pivot means, said actuating means being responsive to the pressure difference between said first pressure and said second pressure so that said dependent movement has different ratios at different pressure differences.

10. Control apparatus for an engine driven pumping device comprising, a fuel consuming engine, a pressure fluid delivering pump driven by said engine, a pressure fluid operated device connected to said pump to receive pressure fluid discharged by said pump at a first pressure and to return pressure fluid to said pump at a second pressure substantially lower than said first pressure, a fuel pumping means connected to deliver fuel to said engine, a regulator for varying the delivery rate of said fuel pumping means, a controller for varying the fluid delivery rate of said pump, elongated means connecting said regulator and said controller for dependent simultaneous movement, pivot means supported by said elongated means and movable longitudinally with respect thereto, said elongated means being pivotable about said pivot means, actuating means connected to said pivot means to cause said longitudinal movement of said pivot means, said actuating means being responsive to the pressure difference between said first pressure and said second pressure so that said dependent movement has different ratios at different pressure differences and selectively operable means connected to said controller to cause movement thereof only before maximum fuel delivery rate is effected.

11. Control apparatus as specified in claim 10 wherein movement of said controller by said operable means is prevented by said actuating means when said regulator is positioned for maximum fuel delivery rate.

References Cited by the Examiner
UNITED STATES PATENTS

| | | | |
|---|---|---|---|
| 2,514,287 | 7/50 | Mueller | 230—9 |
| 2,695,497 | 11/54 | Huber | 60—13 |
| 2,755,988 | 7/56 | Wachsmuth | 230—56 |
| 2,759,327 | 8/56 | Huber | 60—13 |
| 2,841,322 | 7/58 | Wachsmuth | 230—9 |

JOSEPH H. BRANSON, Jr., *Primary Examiner.*
LAURENCE V. EFNER, *Examiner.*